(12) United States Patent
Takai et al.

(10) Patent No.: US 9,470,863 B2
(45) Date of Patent: Oct. 18, 2016

(54) OPTICAL MODULE ASSEMBLY, OPTICAL WIRING BOARD, AND INFORMATION PROCESSING DEVICE USING THEM

(71) Applicant: Hitachi Metals, Ltd., Tokyo (JP)

(72) Inventors: Toshiaki Takai, Tokyo (JP); Yoshinori Sunaga, Tokyo (JP); Masataka Sato, Tokyo (JP); Kinya Yamazaki, Tokyo (JP); Norio Chujo, Tokyo (JP); Naoki Matsushima, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/676,406

(22) Filed: Apr. 1, 2015

(65) Prior Publication Data

US 2015/0286017 A1   Oct. 8, 2015

(30) Foreign Application Priority Data

Apr. 3, 2014   (JP) .................................. 2014-077014

(51) Int. Cl.
*G02B 6/12*     (2006.01)
*G02B 6/42*     (2006.01)
*H01R 12/91*    (2011.01)

(52) U.S. Cl.
CPC .......... *G02B 6/4269* (2013.01); *G02B 6/4284* (2013.01); *H01R 12/91* (2013.01)

(58) Field of Classification Search
CPC ....................................................... G02B 6/428
USPC ................................................................ 385/14
See application file for complete search history.

(56) References Cited

U.S. PATENT DOCUMENTS

| 7,359,594 B2 * | 4/2008 | Nishizawa ........... G02B 6/4214 385/14 |
| 8,478,129 B2 * | 7/2013 | Minota .................. H05K 1/148 398/138 |
| 2012/0213477 A1 * | 8/2012 | He ....................... G02B 6/3817 385/58 |

FOREIGN PATENT DOCUMENTS

| JP | 2001-196625 A | 7/2001 |
| JP | 2009-198921 A | 9/2009 |

* cited by examiner

*Primary Examiner* — Jerry Blevins
(74) *Attorney, Agent, or Firm* — Volpe and Koenig, P.C.

(57) ABSTRACT

The present invention achieves a way of mounting plural optical modules onto a wiring board more simply and more densely. There is provided an optical module assembly for mounting plural optical modules onto a wiring board. The optical module assembly includes the optical modules to which optical wiring has been connected and a module case to accommodate the optical modules. The optical modules and the module case are unified. The module case is provided with a floating mechanism for making the optical modules floating, when accommodated therein. The floating mechanism is comprised of plate springs or the like.

21 Claims, 11 Drawing Sheets

F I G . 7
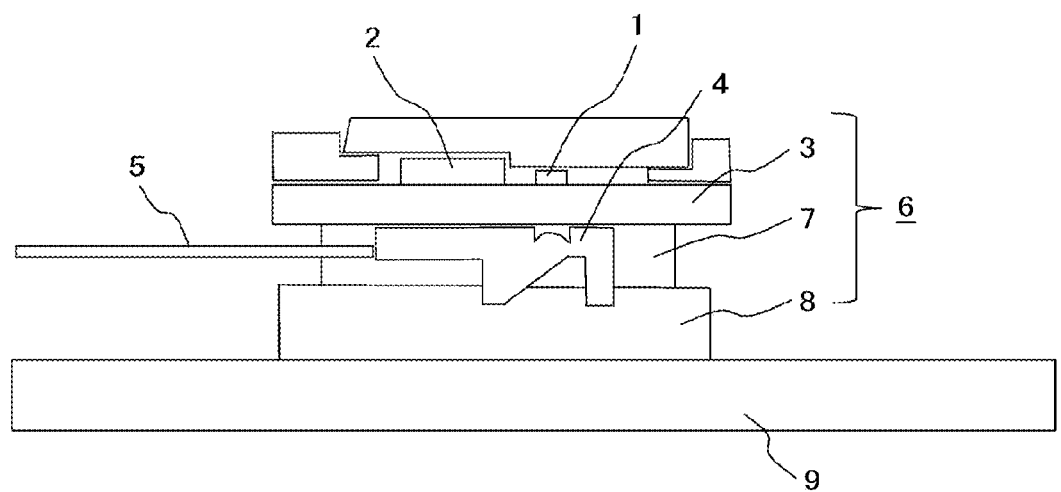

OPTICAL MODULE ASSEMBLY, OPTICAL WIRING BOARD, AND INFORMATION PROCESSING DEVICE USING THEM

CLAIM OF PRIORITY

The present application claims priority from Japanese patent application JP2014-077014 filed on Apr. 3, 2014, the content of which is hereby incorporated by reference into this application.

BACKGROUND OF THE INVENTION

1. Field of the Invention

The present invention relates to an optical interconnect technology that uses light for data transmission within a substrate as well as an optical module assembly in which optical modules have an improved structure and an optical wiring board.

2. Description of the Related Art

Recently, for information processing devices such as servers, routers, and storages, there is a growing need to speed up data transmission within a device or board. Data transmission within these devices is on the verge of change from conventional electrical transmission to optical transmission that enables higher speed transmission.

Information processing devices have several circuit boards installed on a back plane, including a switch board, a blade board, etc. On these boards, LSIs such as a switch LSI, interface module, and CPU are mounted. These circuit boards are connected to the back plane and signal transmission between these boards is performed. Within a circuit board, signal transmission between an LSI and a connector is also performed. For signal transmission within a circuit board, electrical transmission via electrical wiring has so far been used. However, electrical transmission encounters a difficulty in speeding up, because increasing transmission speed causes an increase in loss across wiring on the board and gives rise to a cross talk. Consequently, the use of optical transmission for signal transmission with a circuit board is pursued.

Regarding the use of an optical interconnect technology for signal transmission within a circuit board, in Japanese Unexamined Patent Application Publication No. 2009-198921, there is a description as follows: "An optical module that optically connects an optical transmission path for transmitting an optical signal and an optical element converting an optical signal to an electrical signal and vice versa, comprising an upper structure provided with an optical transmission body and a support member supporting the optical transmission body, a wiring board provided with wiring patterns and connecting electrodes, an electronic components mounting board which is placed over the wiring board and in which electronic components including an optical element are mounted on its top surface and underside electrodes which are electrically connected to the electronic components' electrodes are provided on its under surface, a fitting body which optically connects the optical transmission path in the upper structure to the optical element in the electronic components mounting board and contacts and electrically connects the underside electrodes of the electronic components mounting board and the connecting electrodes of the wiring board by vertically pressing and fixing the upper structure and the electronic components mounting board onto the wiring board, characterized in that the underside electrodes of the electronic components mounting board or the connecting electrodes of the wiring board are formed to protrude." (Claim 1)

In Japanese Unexamined Patent Application Publication No. 2001-196625, a board to board interconnection device is described in which a chip carrier on which a ferrule embracing a lens array and a semiconductor laser or photo diode are mounted is supported on a wiring board via elastic bodies. There is also a description that the elastic bodies support the chip carrier vertically to the main surface of the wiring board and pressure is exerted toward an optical axis direction in a split sleeve, when connecting a ferrule of an optical transmitter unit in a first wiring board and a ferrule of an optical receiver unit in a second wiring board. (Claims 1 and 2)

SUMMARY OF THE INVENTION

In Japanese Unexamined Patent Application Publication No. 2009-198921, it is described that an optical module having the optical transmission body such as an optical fiber is installed onto the wiring board by a fitting member (fitting body) having elasticity, which is fixed to the wiring board. However, in Japanese Unexamined Patent Application Publication No. 2009-198921, it is only described that one optical module is installed onto the wiring board, but there is no description about a problem when installing plural optical modules onto a wiring board.

The invention described in Japanese Unexamined Patent Application Publication No. 2001-196625 relates to an optical interconnection device that interconnects wiring boards. No description is found of installing plural optical modules onto a wiring board and fitting the optical modules all together at once.

It is an object of the present invention to achieve a way of mounting plural optical modules onto a wiring board more simply and more densely.

To attain the above object, the present invention adopts configurations described in the claims.

While the present invention includes several means for solving the above problem, as one example of an optical module assembly, there is provided an optical module assembly for mounting a plurality of optical modules onto a wiring board, the optical module assembly including the optical modules to which optical wiring has been connected and a module case to accommodate the optical modules. The optical modules and the module case are unified.

As one example of an optical wiring board of the present invention, there is provided an optical wiring board including a wring board and an optical module assembly in which a plurality of optical modules are assembled. The wiring board includes electric connectors and the optical module assembly includes the optical modules and a module case to accommodate the optical modules. The optical modules and the module case are unified. Once the optical module assembly has been mounted onto the wiring board, the electric connectors on the wiring board and electric connectors of the optical modules are fit together in engagement.

In the present invention, it is preferable that the module case is provided with a floating mechanism for making the optical modules floating, when accommodated therein.

According to the present invention, an optical module assembly is configured in which plural optical modules are accommodated in a single module case. Thereby, it is achievable to mount optical modules onto a wiring board more simply and more densely.

It is also possible to realize fitting of an optical module assembly at a time by providing each optical module with a

BRIEF DESCRIPTION OF THE DRAWINGS

FIG. 7 is a diagram depicting an example of an optical module;

DETAILED DESCRIPTION OF THE INVENTION

Figure 2:
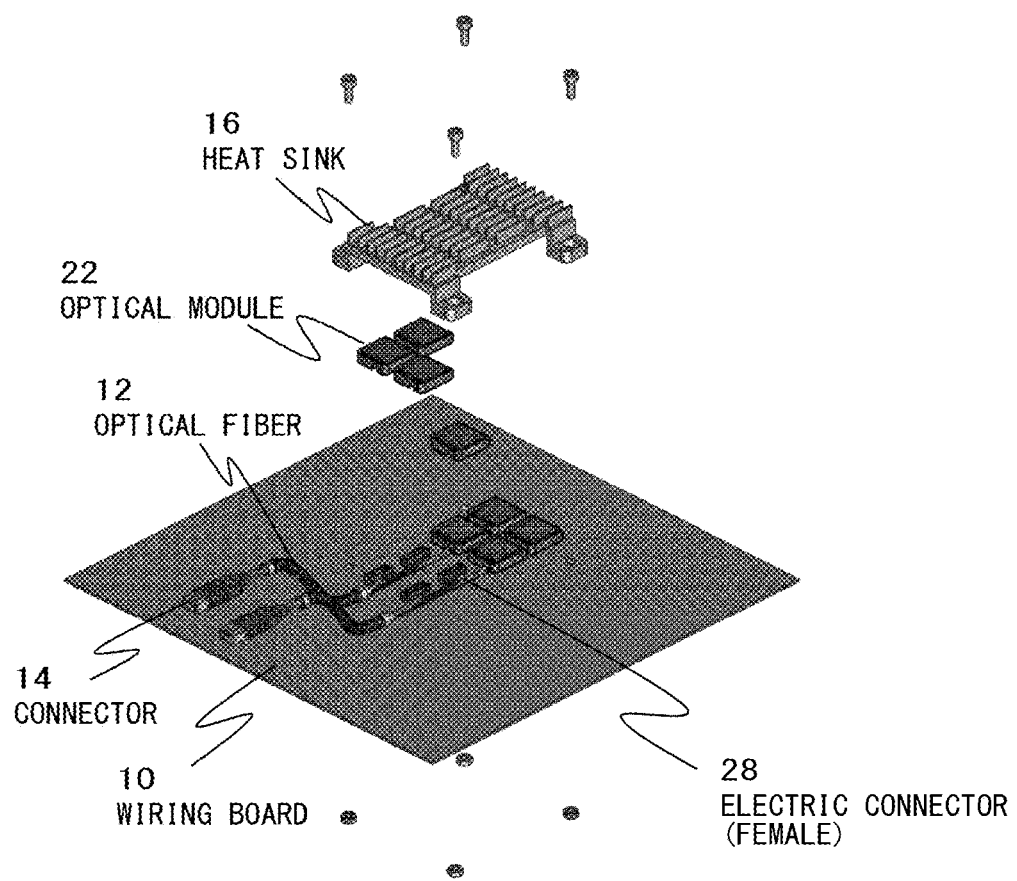
FIG. 2 is a diagram depicting a related art example in which plural optical modules are placed on a wiring board.

FIG. 2 depicts a related art example of an optical wiring board in which plural optical modules are mounted on the wiring board. Optical modules 22 are serially installed one by one onto a wiring board 10. Once an optical module 22 has been installed, an electric connector (male) (not depicted) of the optical module 22 and an electric connector (female) 28 on the wiring board are fit together in engagement and electrically connected. An optical fiber 12 is connected to each optical module 22 and a connector 14 is attached to the other end of the optical connector 12. A heat sink 16 is installed over the optical modules 22 with screws and nuts.

In such an optical wiring board, as the number of optical modules to be mounted increases, it would take a longer time to position and install them. Besides, it is difficult to install optical modules more densely.

The present invention would solve these problems. First of all, when mounting plural optical modules onto a wring board, the present invention would achieve a way of mounting the optical modules onto the wiring board more simply and more densely.

Embodiments of the present invention will be described below, based on the drawings. In each of the drawings for explaining the embodiments, an element having a same function is assigned an identical name and reference numeral and repeated description thereof is omitted.

First Embodiment

Figure 1:
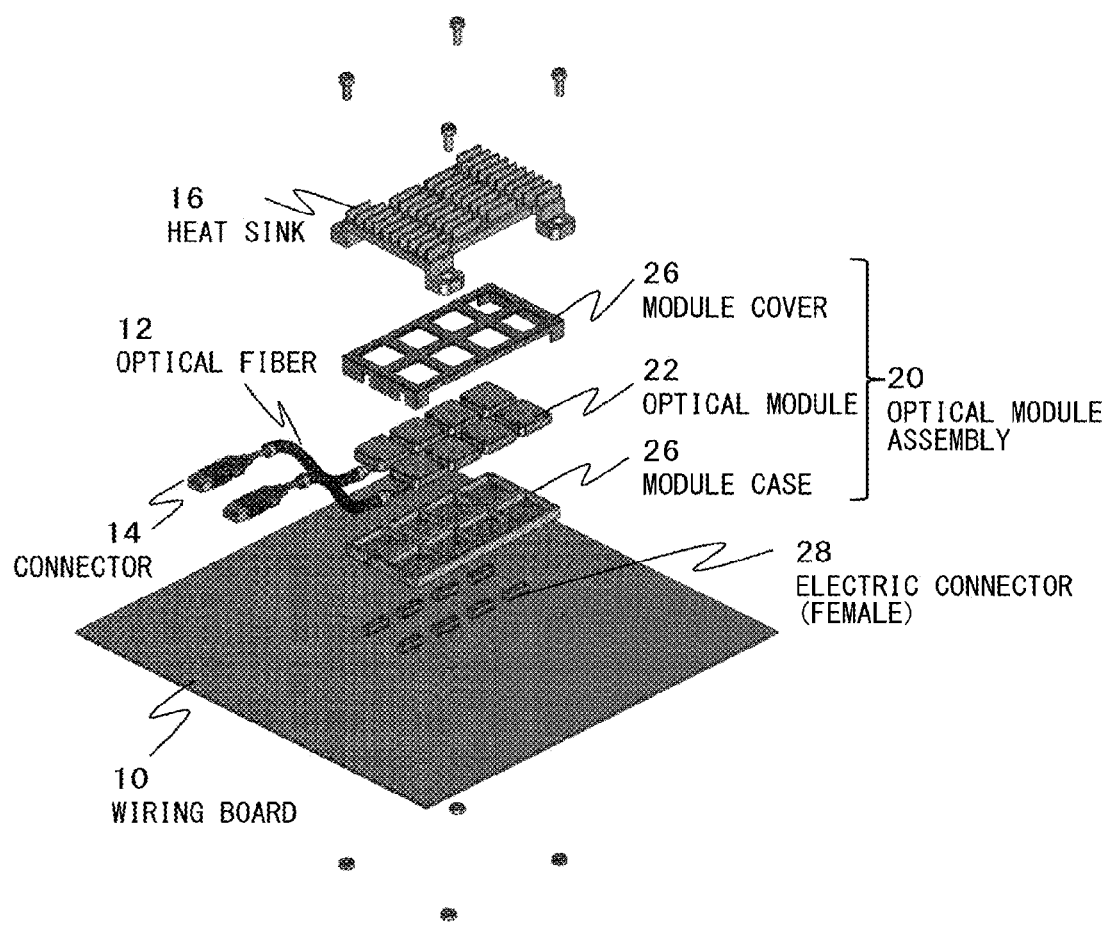
FIG. 1 is a diagram depicting an optical module assembly of a first embodiment of the present invention.

FIG. 1 depicts an optical wiring board on which an optical module assembly of a first embodiment of the present invention is mounted.

In FIG. 1, the optical module assembly 20 is comprised of plural optical modules 22, a module case 24, and a module cover 26. The optical module assembly 20 is configured by accommodating the plural optical modules 22 inside the module case 24 and covering them with the module cover 26. It is preferable that the module case 24 has plural recesses for accommodating the respective optical modules. An optical fiber 12 to which a connector 14 is attached is connected to the optical modules 22 and the optical module assembly 20 that is unified including the plural optical modules is configured. The optical module assembly 20 is mounted onto a wiring board 20, while aligning the positions of electric connectors (male) (not depicted) of the optical modules 28 with electric connectors (female) on the wiring board 10. A heat sink 12 is installed over the optical module assembly 20 with screws and nuts.

According to the present embodiment, by unifying the optical modules into the optical module assembly, it is possible to mount the plural optical modules onto the wiring board all together at the same time. It is also possible to install plural optical modules more densely.

Second Embodiment

In the case of an optical module assembly in which plural optical modules are accommodated in a single module case, as in the first embodiment, positional misalignment between male and female pairs of electric connectors may occur depending on machining accuracy of the module case and mounting accuracy of the electric connectors (male and female) among others. Therefore, it is difficult to fit all the potential connectors all together at once and ensure the conduction of all the optical modules.

Figure 3A:
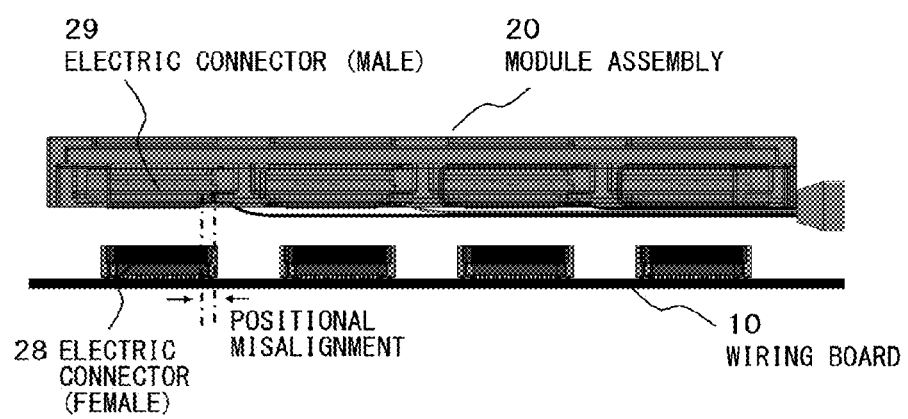
FIG. 3A is diagram representing a problem involved with the optical module assembly of the first embodiment.
Figure 3B:
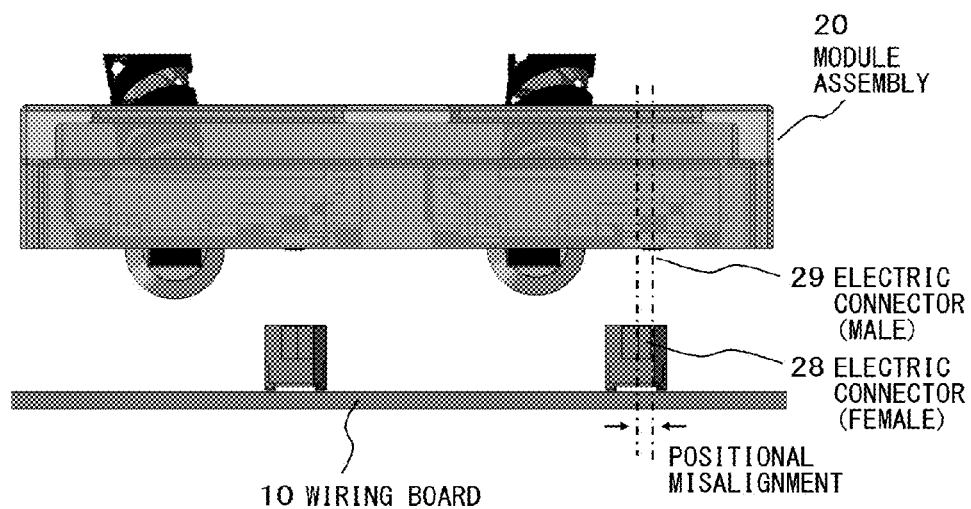
FIG. 3B is diagram representing a problem involved with the optical module assembly of the first embodiment.

FIG. 3A depicts a side view in a longitudinal direction of an optical module assembly and FIG. 3B depicts a side view in a lateral direction of the optical module assembly. Given that the machining accuracy of the module case is within ±100 µm, the mounting accuracy of the electric connectors (male) is within ±200 µm, and the mounting accuracy of the electric connectors (female) is within ±200 µm, positional misalignments as depicted in FIGS. 3A and 3B may occur and a positional misalignment of about 500 µm at maximum may occur between male and female pairs of electric connectors. In previously existing technology, it is only possible to absorb a positional misalignment of about 300 µm or less and conduction of all the optical modules cannot be assured.

A second embodiment solves this problem and realizes fitting of an optical module assembly at a time by providing each optical module with a floating mechanism to absorb a positional misalignment between male and female pairs of electric connectors.

Figure 4:
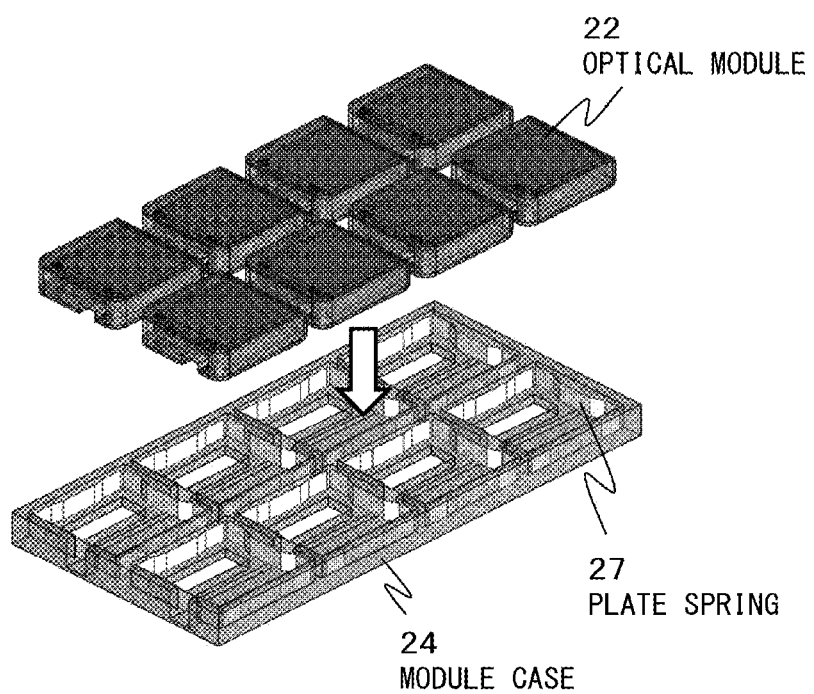
FIG. 4 is a perspective view depicting an optical module assembly of a second embodiment of the present invention.
Figure 5:
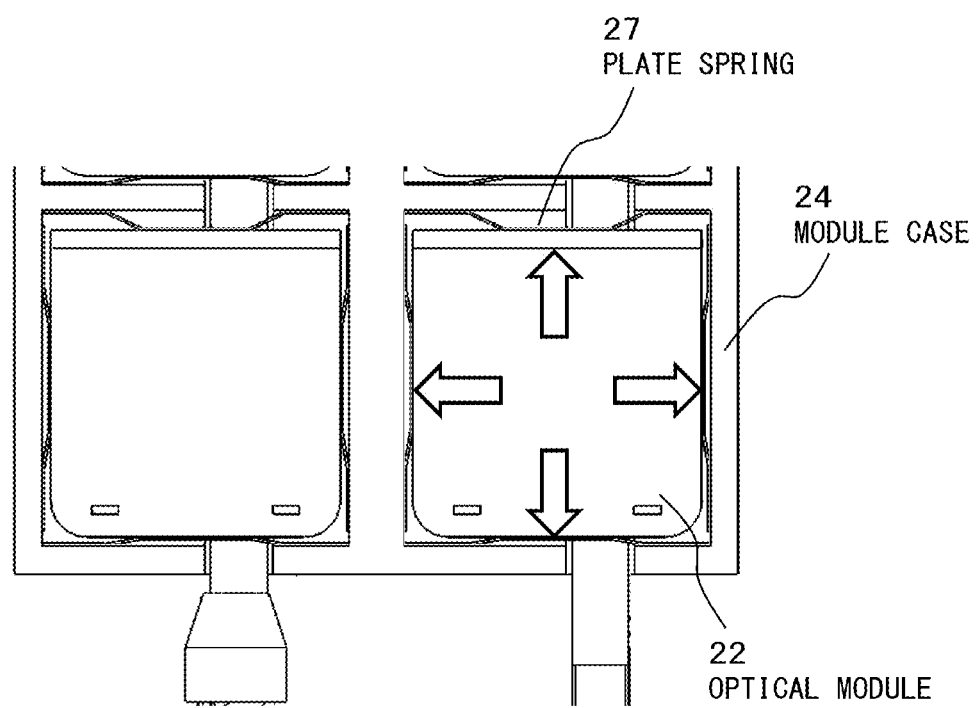
FIG. 5 is a plan view depicting the optical module assembly of the second embodiment of the present invention.

FIGS. 4 and 5 depict an optical module assembly of the second embodiment of the present invention. FIG. 4 depicts a perspective view of the optical module assembly and FIG. 5 depicts a plan view of a part of the optical module assembly. Each of the recesses of the module case 24 to accommodate the optical modules 22 is provided with elastic bodies such as plate springs 27 on its sidewalls (on four inner sides, for example). When the optical modules 22 have been installed in the recesses of the module case 24, the optical modules 22 can move freely in a planar direction owing to the elasticity of the plate springs 27, as indicated by arrows in FIG. 5, and they are floating. The optical modules move freely, thus allowing each pair of the electric connectors (female) provided on the wiring board and the electric connectors (male) of the optical modules to be fit together in engagement.

FIGS. 6A through 6E depict a process of manufacturing the optical module assembly of the second embodiment of the present invention.

Figure 6A:
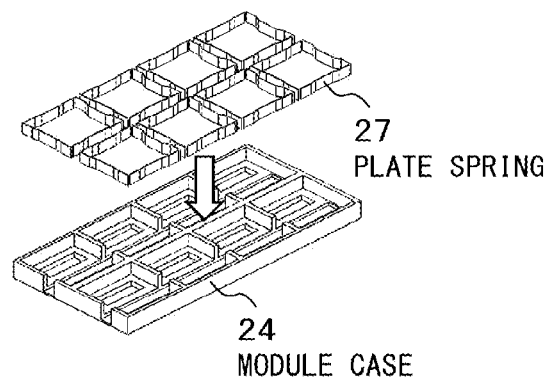
FIG. 6A is a diagram depicting a process of manufacturing the optical module assembly of the second embodiment of the present invention.

As depicted in FIG. 6A, place plate springs 27 on the inside surfaces of the respective recesses of the module case 24.

Figure 6B:
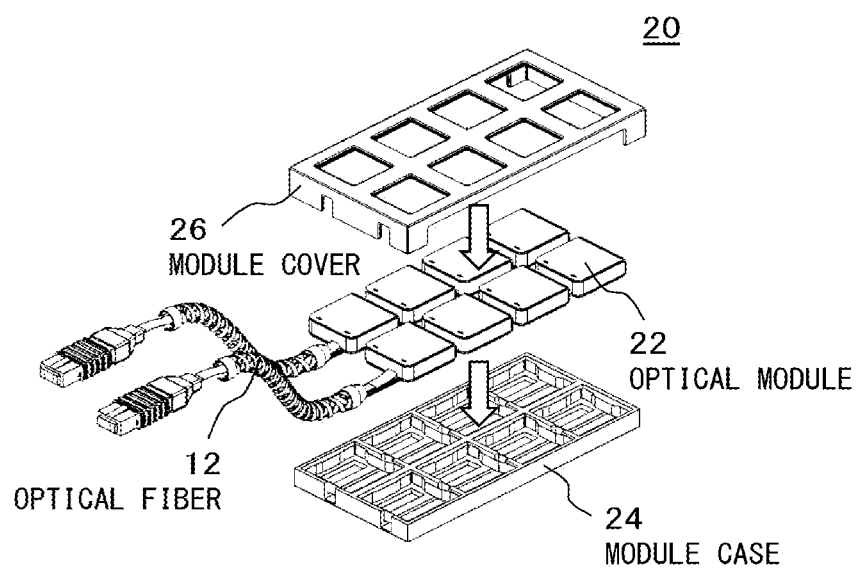
FIG. 6B is a diagram depicting the process of manufacturing the optical module assembly of the second embodiment of the present invention.

As depicted in FIG. 6B, install the optical modules 22 with optical fibers 12 attached thereto in the respective recesses in which the plate springs are placed. Then, the optical module assembly 20 is configured by installing the module cover 26.

Figure 6C:
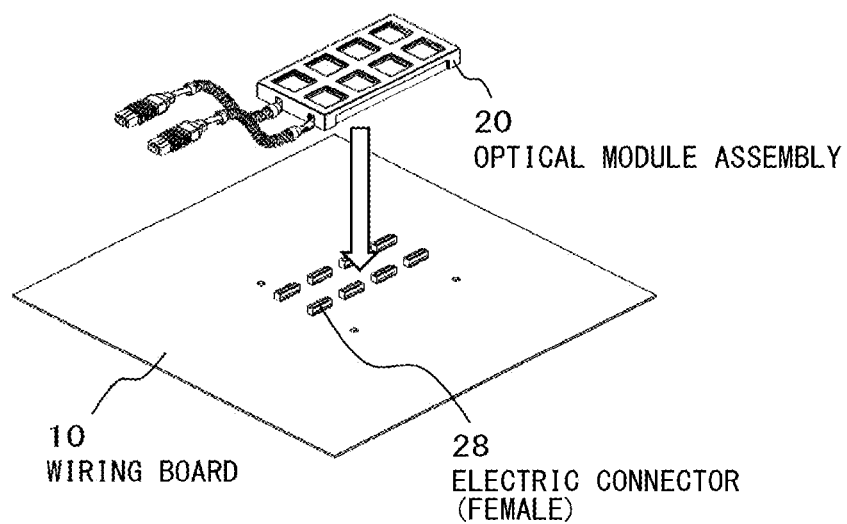
FIG. 6C is a diagram depicting the process of manufacturing the optical module assembly of the second embodiment of the present invention.

As depicted in FIG. 6C, mount the optical module assembly 20 onto the wiring board 10. When doing so, each pair of the electric connectors (female) 28 on the wiring board and the electric connectors (male) 28 of the optical modules is fit together in engagement owing to the fact that the optical module assembly is provided with the floating mechanism which is comprised of the plate springs 27.

Figure 6D:
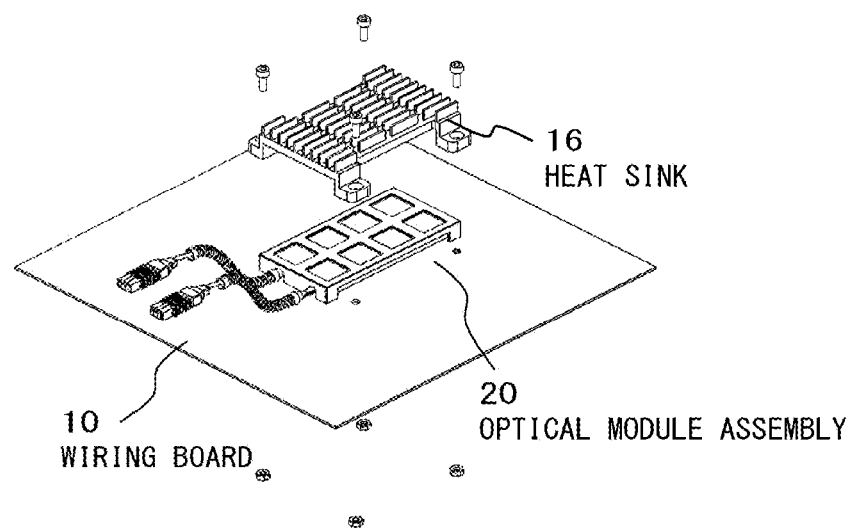
FIG. 6D is a diagram depicting the process of manufacturing the optical module assembly of the second embodiment of the present invention.

As depicted in FIG. 6D, install the heat sink 16 over the optical module assembly 20.

Figure 6E:
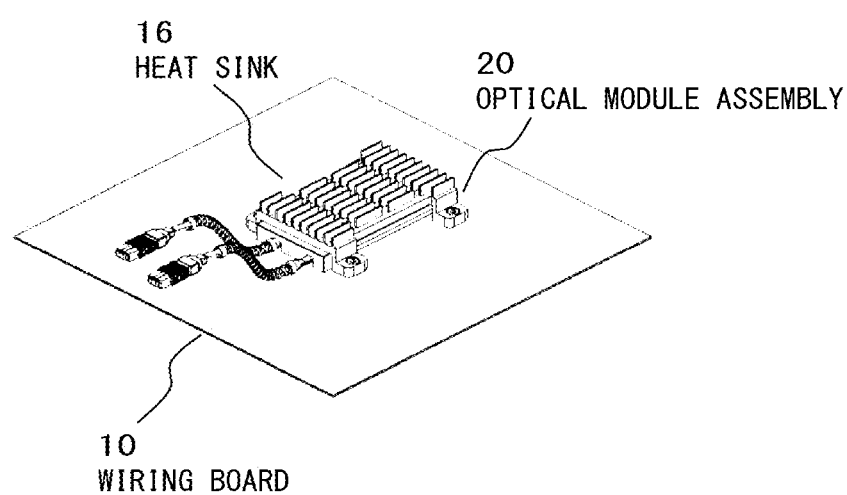
FIG. 6E is a diagram depicting the process of manufacturing the optical module assembly of the second embodiment of the present invention.

As depicted in a finished product view of FIG. 6E, an optical wiring board in which plural optical modules 20 are mounted on the wring board 10 and the heat sink 16 is installed is finished up.

According to the present embodiment, each optical module is provided with the floating mechanism by placing the plate springs on the sidewalls of the module case to accommodate the optical modules. This mechanism is capable of absorbing a positional misalignment between male and female pairs of electric connectors and makes it possible to realize fitting of an optical module assembly at a time.

Although the plate springs 27 that are placed in the recesses of the module case are separate individually, as in the relevant drawing, plural plate springs to be placed in plural recesses may be coupled into a single assembly. By coupling plural plate springs into a single assembly, it will become easy to install the plate springs 27 in the module case 24.

Although plate springs are used as elastic bodies in the present embodiment, it is obvious that elastic bodies such as coil springs other than the plate springs can be used. Although plate springs are placed on the four inner sides of the recesses in the present embodiment, they may only be placed on at least either of two opposite inner sides.

One example of an optical module that is accommodated in the module case is given here. In FIG. 7, an optical element (light emitting element or light receiving element) 1 and an electronic circuit 2 (a circuit for driving the light emitting element or for amplifying an electric signal) are mounted on a substrate 3 for electric wiring. The substrate 3 for electric wiring is made of a material that transmits light from the light emitting element. An optical connector 4 with an attached optical fiber 5 is mounted on a surface reverse to the surface of the substrate 3 for electric wiring having the optical element 1 and the electronic circuit 2 mounted thereon. The optical connector 4 has a structure in which a reflector that redirects the light path by 90 degrees and a lens are monolithically integrated. This enables optical coupling between the optical fiber 5 and the optical element 1. An electric connector (male) 7 is an in-line type connector and connected to the substrate 3 for electric wiring. By inserting the electric connector (male) 7 into an electric connector (female) placed on the wiring board 9, the optical module 6 having the optical connector 4 with the attached optical fiber 5 mounted thereon is placed on the wiring board 9.

Third Embodiment

An optical wiring board of a third embodiment of the present invention is one in which an improvement is made to the arrangement of plural optical modules within an optical module assembly and the placement of the optical module assembly and an integrated circuit.

Figure 8:
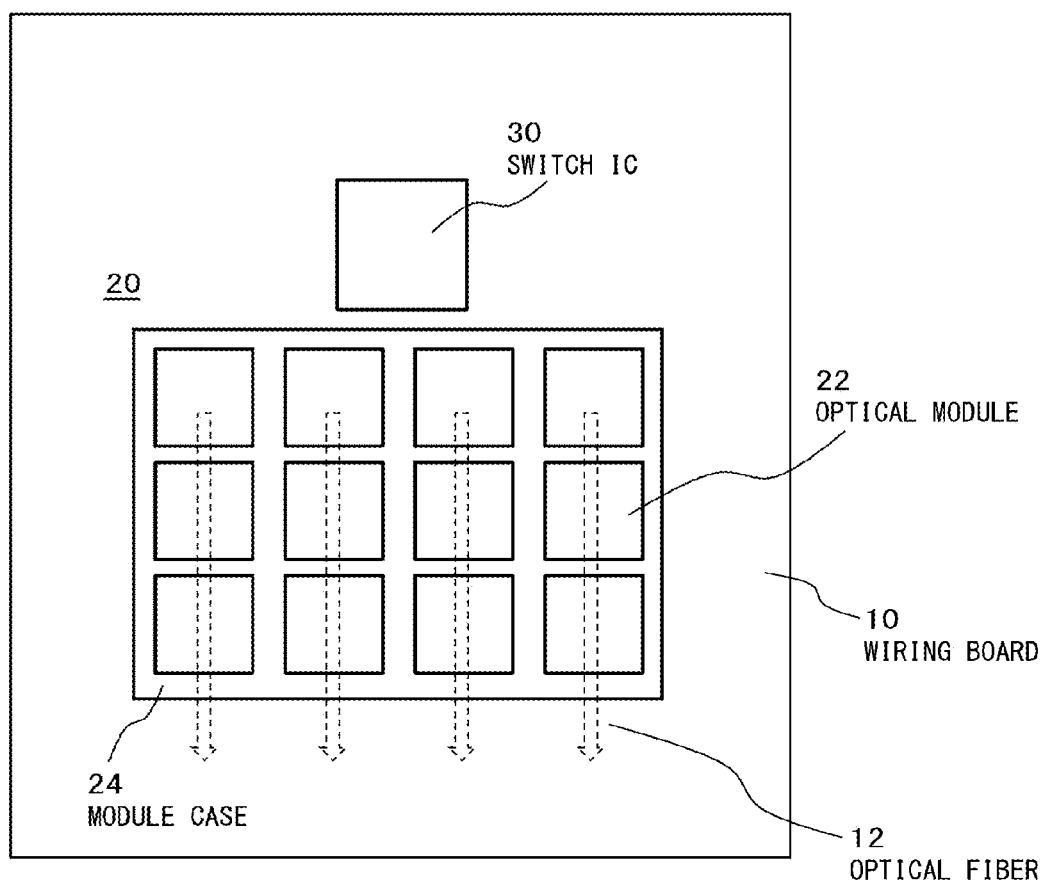
FIG. 8 is a diagram depicting an optical wiring board of a third embodiment of the present invention.

FIG. 8 depicts the optical wiring board of the present embodiment having an optical module assembly and an integrated circuit mounted thereon. The optical module assembly 20 is one in which plural optical modules 22 are arranged in plural rows and columns in a matrix. On the wiring board 10, the optical module assembly 20 and an integrated circuit 30 such as a switch IC are mounted adjacently. The integrated circuit 30 and electric connectors (not depicted) in place where the respective optical modules are installed are electrically connected with wiring patterns on the wiring board 10. Pairs of electric connectors are connected with each other by installing the optical module assembly 20 having the plural optical modules 22 mounted therein onto the wiring board 10.

Dotted arrows in the drawing denote optical fibers 12 and the optical fibers are installed in one direction in this example.

Fourth Embodiment

Figure 9:
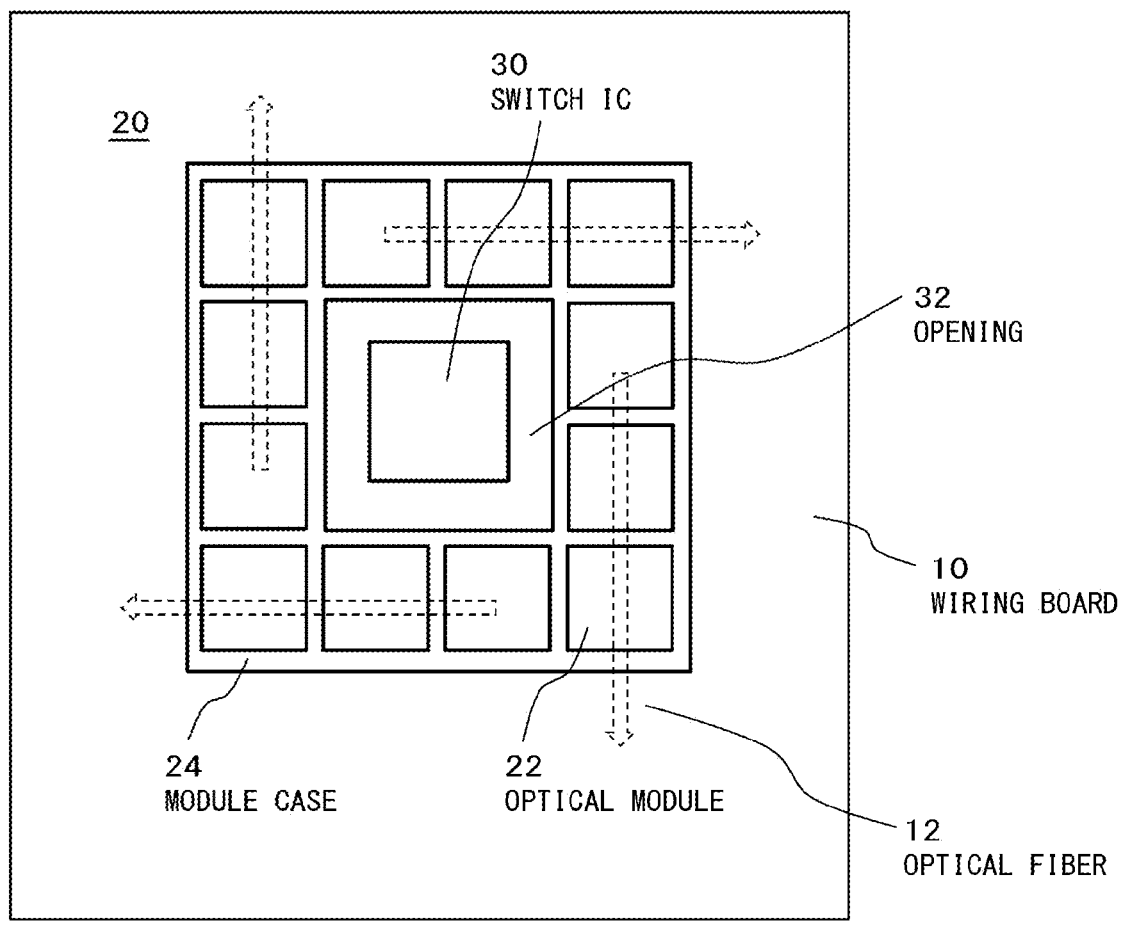
FIG. 9 is a diagram depicting an optical wiring board of a fourth embodiment of the present invention.

FIG. 9 depicts an optical wiring board of a fourth embodiment of the present invention, having an optical module assembly and an integrated circuit mounted thereon. The optical module assembly 20 has an opening 32 in its center and plural optical modules 22 are arranged around the opening 32. On the wiring board 10, an integrated circuit 30 such as a switch IC is placed in the opening 32 of the optical module assembly 20.

The integrated circuit 30 and electric connectors (not depicted) in place where the respective optical modules are installed to surround the integrated circuit are electrically connected with wiring patterns on the wiring board 10. Pairs of electric connectors are connected with each other by installing the optical module assembly 20 having the plural optical modules 22 mounted therein onto the wiring board 10.

Dotted arrows in the drawing denote optical fibers and the optical fibers are installed symmetrically in fours directions in this example.

According to the present embodiment, it will become easy to wire between the integrated circuit 30 and the optical modules 22 by placing the integrated circuit 30 in the opening 32 of the optical module assembly 20 and arranging the plural optical modules 22 around the opening 32. The integrated circuit 30 and the optical modules 22 are allowed to use a common radiating fin.

What is claimed is:

1. An optical module assembly for mounting optical modules of a plurality of optical modules onto a wiring board, the optical module assembly comprising:

the optical modules to which optical wiring has been connected and a module case to accommodate the optical modules, wherein each of the optical modules comprises,
a substrate for electric wiring, an optical element, and an electronic circuit, and the optical element and the electronic circuit are mounted on the substrate for electric wiring,
an electric connector of the optical module, which is connected to the substrate for electric wiring, and
a rectangular case in which the substrate for electric wiring is accommodated;
wherein the module case comprises a plurality of recesses to accommodate individual optical modules, and each recess of the plurality of recesses is composed of four inner sidewalls and a bottom wall, wherein the bottom wall has a hole through which the electric connector of the optical module passes; and
wherein the optical modules and the module case are unified.

2. The optical module assembly according to claim 1, wherein the module case is provided with a floating mechanism for making the optical modules float, when accommodated therein.

3. The optical module assembly according to claim 2, wherein the floating mechanism includes elastic bodies.

4. The optical module assembly according to claim 3, wherein the floating mechanism includes plate springs placed on sidewalls of recesses to accommodate individual optical modules.

5. The optical module assembly according to claim 4, wherein the plate springs are placed on four inner sidewalls of the recesses to accommodate the optical modules.

6. The optical module assembly according to claim 4, wherein the plate springs are assembled such that a plurality of plate springs, which are placed in the plurality of recesses to accommodate the optical modules, are coupled into a single assembly.

7. An optical module assembly for mounting optical modules of a plurality of optical modules onto a wiring board, the optical module assembly comprising:
the optical modules to which optical wiring has been connected and a module case to accommodate the optical modules, wherein
the module case is provided with a floating mechanism for making the optical modules float, when accommodated therein;
the floating mechanism for making the optical modules float includes elastic bodies and plate springs, wherein the plate springs are placed on four inner sidewalls of recesses to accommodate individual optical modules; and
the optical modules and the module case are unified.

8. An optical module assembly for mounting optical modules of a plurality of optical modules onto a wiring board, the optical module assembly comprising:
the optical modules to which optical wiring has been connected and a module case to accommodate the optical modules, wherein
the module case is provided with a floating mechanism for making the optical modules float, when accommodated therein;
the floating mechanism for making the optical modules float includes elastic bodies and plate springs, wherein the plate springs are placed on sidewalls of recesses to accommodate individual optical modules and the plate springs are assembled such that a plurality of plate springs which are placed in a plurality of recesses to accommodate the optical modules are coupled into a single assembly and
the optical modules and the module case are unified.

9. An optical wiring board comprising a wiring board and an optical module assembly in which optical modules of a plurality of optical modules are assembled,
the wiring board including electric connectors on the wiring board,
the optical module assembly including the optical modules and a module case to accommodate the optical modules,
wherein each of the optical modules comprises,
a substrate for electric wiring, an optical element, and an electronic circuit, and the optical element and the electronic circuit are mounted on the substrate for electric wiring,
an electric connector of the optical module, which is connected to the substrate for electric wiring, and
a rectangular case in which the substrate for electric wiring is accommodated;
wherein the module case comprises a plurality of recesses to accommodate individual optical modules, and each recess of the plurality of recesses is composed of four inner sidewalls and a bottom wall, and the bottom wall has a hole through which the electric connector of the optical module passes;
wherein the optical modules and the module case are unified; and
wherein, once the optical module assembly has been mounted onto the wiring board, the electric connectors on the wiring board and the electric connectors of the optical modules are fit together in engagement.

10. The optical wiring board according to claim 9, wherein the module case is provided with a floating mechanism for making the optical modules float, when accommodated therein.

11. The optical wiring board according to claim 10, wherein the floating mechanism for making the optical modules float includes elastic bodies.

12. The optical wiring board according to claim 11, wherein the floating mechanism includes plate springs placed on sidewalls of recesses to accommodate individual optical modules.

13. The optical wiring board according to claim 12, wherein the plate springs are placed on four inner sidewalls of the recesses to accommodate the optical modules.

14. The optical wiring board according to claim 12, wherein the plate springs are assembled such that a plurality of plate springs, which are placed in a plurality of recesses to accommodate the optical modules, are coupled into a single assembly.

15. The optical wiring board according to claim 12, wherein
the optical module assembly is one in which the plurality of optical modules are arranged in a plurality of rows and columns in a matrix, and
the optical module assembly and an integrated circuit are placed adjacently.

16. The optical wiring board according to claim 12, wherein
the optical module assembly has an opening in its center and the plurality of optical modules are arranged around the opening, and
the integrated circuit is placed in the opening of the optical module assembly.

17. An information processing device equipped with the optical wiring board according to claim 9.

18. An optical wiring board comprising a wiring board and an optical module assembly in which optical modules of a plurality of optical modules are assembled
- the wiring board including electric connectors on the wiring board,
- the optical module assembly including the optical modules and a module case to accommodate the optical modules, wherein
- the module case is provided with a floating mechanism for making the optical modules float, when accommodated therein;
- the floating mechanism for making the optical modules float includes elastic bodies and plate springs, wherein the plate springs are placed on four inner sidewalls of recesses to accommodate the optical modules;
- the optical modules and the module case are unified; and
- once the optical module assembly has been mounted onto the wiring board, the electric connectors on the wiring board and electric connectors of the optical modules are fit together in engagement.

19. An optical wiring board comprising a wiring board and an optical module assembly in which optical modules of a plurality of optical modules are assembled
- the wiring board including electric connectors on the wiring board,
- the optical module assembly including the optical modules and a module case to accommodate the optical modules, wherein
- the module case is provided with a floating mechanism for making the optical modules float, when accommodated therein;
- the floating mechanism for making the optical modules float includes elastic bodies and plate springs, wherein the plate springs are placed on sidewalls of recesses to accommodate individual optical modules and the plate springs are assembled such that a plurality of plate springs which are placed in a plurality of recesses to accommodate the optical modules are coupled into a single assembly;
- the optical modules and the module case are unified; and
- once the optical module assembly has been mounted onto the wiring board, the electric connectors on the wiring board and electric connectors of the optical modules are fit together in engagement.

20. An optical wiring board comprising a wiring board and an optical module assembly in which optical modules of a plurality of optical modules are assembled
- the wiring board including electric connectors on the wiring board,
- the optical module assembly including the optical modules and a module case to accommodate the optical modules, wherein
- the optical module assembly is one in which a plurality of optical modules are arranged in a plurality of rows and columns in a matrix;
- the optical module assembly and an integrated circuit are placed adjacently;
- the optical modules and the module case are unified; and
- once the optical module assembly has been mounted onto the wiring board, the electric connectors on the wiring board and electric connectors of the optical modules are fit together in engagement.

21. An optical wiring board comprising a wiring board and an optical module assembly in which optical modules of a plurality of optical modules are assembled
- the wiring board including electric connectors on the wiring board,
- the optical module assembly including the optical modules and a module case to accommodate the optical modules, wherein
- the optical module assembly has an opening in its center and the plurality of optical modules are arranged around the opening;
- an integrated circuit is placed in the opening of the optical module assembly;
- the optical modules and the module case are unified; and
- once the optical module assembly has been mounted onto the wiring board, the electric connectors on the wiring board and electric connectors of the optical modules are fit together in engagement.

* * * * *